United States Patent Office 3,117,937
Patented Jan. 14, 1964

3,117,937
PRODUCTION AND REGENERATION OF LEAD SULFIDE CATALYST
James G. Suthard, Long Beach, Calif., assignor to Petrolite Corporation, Wilmington, Del., a corporation of Delaware
No Drawing. Filed Feb. 25, 1960, Ser. No. 10,873
8 Claims. (Cl. 252—414)

My invention relates to the rejuvenating, reconstituting or reconditioning of solid catalysts useful in the sweetening of petroleum products. It will be exemplified as applied to the reconditioning of the so-called Bender catalyst that has become contaminated by gums.

In the catalytic sweetening of sour distillates, the distillate is passed through a catalytic bed composed of particles of a suitable base material, such as furnace slag, Carborundum, sawdust, etc., coated with a sulphide of a polyvalent metal which in the Bender process is lead sulphide (PbS). The lead sulphide catalyst is conventionally made by crushing furnace slag to a size about 5/16" or smaller, wetting this with a binder, typically sodium silicate or metasilicate, and then coating the particles with lead oxide (PbO). A mass of this catalyst is placed in a column above a bed of crushed rock or smooth gravel of larger particle size supported by a suitable screen. The PbO is then converted to PbS in large measure by passing through the column a distillate containing an excess of elemental sulphur.

An alkaline solution is added to the sour distillate before upward passage through the bed in amount sufficient to keep the distillate slightly alkaline. In addition, elemental sulphur is added to the sour distillate before contact with the catalyst, the amount thereof preferably not exceeding the amount theoretically required to convert the mercaptans to disulphides. Air or oxygen is mixed with the stream to be treated before passing through the bed.

In such a sweetening operation it is most desirable that the catalyst bed be maintained as a mass of granules, without packing or solidification into a solid mass. Maintenance in granular condition is desirable not only to improve the sweetening operation but to permit periodic removal of the catalyst for reactivation. Heretofore such reactivation has been effected by steaming the mass while in place in the column to remove any volatile organic matter, then water washing the mass if the binder is not water soluble and then removing and drying the granular material. Such a water wash is preferably to be avoided not only because of its action on the binder but because it loosens and removes substantial portions of the PbS.

Under adverse conditions or if the sweetening process is improperly used, the catalyst bed becomes compacted or solidified and it has been necessary in some instances to chip it away and discard it. Certain distillates charged to the bed without gum inhibitors adversely affect the catalyst both by destroying the effectiveness of the coating and causing serious compaction or solidification. Under some conditions the supply of air or an increase therein may induce solidification of the catalyst through the formation of peroxides and peracids which may deposit on the catalyst as gums. Generally speaking, one of the primary causes of such solidification is deposition of gums from the above sources, the gums acting as a solidifying binder. The situation becomes extremely serious when the mass cannot be loosened within the column by conventional means.

It is an object of the present invention to provide a process for rejuvenating or reconditioning a lead sulphide catalyst that has become compacted or solidified in use in the sweetening of petroleum distillates.

It is a further object to subdivide such compacted catalyst and to blow same with hot air at a temperature above the boiling point of water until the catalyst is dry, thereafter reforming the lead catalyst coating on the particles if this is necessary.

A further object is to subdivide a gum-containing lead sulphide catalyst and spread same on a surface exposed to the atmosphere to effect decomposition of the gums and further subdivision of the catalyst before such air blowing.

Another object is to employ $H_2S$ to convert PbO on the surfaces of particles of a suitable base material to PbS on such surfaces.

Further objects and advantages of the invention will be evident to those skilled in the art from the accompanying description of exemplary embodiments.

In the rejuvenating, reconstituting or reconditioning of a catalyst bed that has become compacted or solidified because of any of the above-mentioned reasons, the first step is to subdivide the catalyst, preferably after steaming the compacted mass to remove $H_2S$ and organic vapors as a health or safety measure. The mass while still in the tower can be roughly subdivided into chunks by digging with bars, boring, picking and/or jarring. The chunks are then removed from the tower for further subdivision, some of which may be effected by the handling of the chunks during such removal.

The oxidizing action of air has been found to be very useful in such further subdivision, particularly if the compaction or solidification is at least in part the result of the presence of gums. Air may be used to effect the desired further subdivision either by forcing a stream through a mass of the chunks or spreading the latter on a slab or other surface in a relatively thin layer to be exposed to a relatively dry atmosphere. For example, if a layer about 2–6" deep is exposed to the atmosphere in an outside location protected from rain for several days it will crumble to granular size. The action can be made more rapid by spreading the layer in a sunny location. Raking may also be used to aid subdivision. If the catalyst contains some of the gravel or rock of the supporting bed this is preferably screened out. Such screening may further subdivide the catalyst. Subdivision is desirably carried to the point of substantially reproducing the original particle size of the catalyst, e.g. about 1/4–3/8" in most instances.

The subdivided catalyst should be inspected to determine the presence of residual organic material and coatings of PbO and PbS. Normally all will be present in varying degrees.

The catalyst is then placed in one or more masses in equipment suitable for airblowing same. In many instances it can be returned to the towers for this operation but in other instances the airblowing can be performed in separate equipment.

Air at an inlet temperature of 250° F. or higher is blown through a mass of the subdivided catalyst for a period of at least several hours until the obnoxious odors of the decomposition products have ceased. The air will progressively heat the mass and it is preferable to continue the air-drying until the outlet aperture is about 250–300° F., usually about 265° F. Airblowing for at least 8 hours is usually required and longer periods are desirable, typically 8–40 hours, as the catalyst does not readily give up its moisture. The action in this step is to thoroughly dry the subdivided catalyst and decompose residual organic material including gums. Heating in this step also tends to convert any free sulphur to PbS if PbO is present.

As the mass cools it is desirable to flood it with a petroleum distillate to prevent inclusion of moisture from the atmosphere. A distillate boiling in the kerosene range will be found quite suitable. The distillate-wet catalyst if not already in the towers is then returned thereto.

Normally the lead content of the catalyst will be adequate, if not depleted by a previous prolonged washing step, but some may still be in the form of the oxide. To convert the PbO of the wetted catalyst to PbS it has been found desirable to bubble $H_2S$ through the distillate-containing beds until $H_2S$ appears in the effluent gas. This may require several hours, depending upon the amount of PbO to be converted and the concentration of $H_2S$, but has been found to be very effective in producing the desired conversion.

The $H_2S$-saturated bed may be used in its then conditioned state but it is preferred to allow it to stand for a day or more, perferably at least 3 days to a work. This further improves and hardens the PbS surface coatings. The catalyst beds are then in condition for reuse.

The bubbling of $H_2S$ through a distillate-flooded bed composed of new catalyst has also been found to be an excellent way of forming the improved PbS surfaces thereon. Thus, in conditioning or activating a newly installed bed of catalyst particles coated with PbO in the manufacturing process, it is desirable to airblow same at about 250–300° F. as above, then flood same with a petroleum distillate of the type described, and then bubble $H_2S$ therethrough for several hours or more or until $H_2S$ appears in the effluent gas. This converts the PbO on the surface of the particles to PbS and conditions the catalyst much more rapidly than is possible in older processes. The saturated mass can be immediately employed for the sweetening operation but it is vastly improved by permitting it to stand for 1–7 days to improve and harden the PbS coating.

The airblowing step is a very desirable one in all embodiments of the invention as it removes gums and/or moisture thus allowing good conversion of the distillate-wetted catalyst with $H_2S$. Moisture in the bed results in formation of a water-wetted PbS coating which is not an effective surface for conversion of the mercaptans to disulphide or for other actions involved in the sweetening of light petroleum distillates passed through the bed with an elemental sulphur content. Moisture on the PbS surfaces during use reduces the effective catalytic area thus reducing or stopping the desired oxidation that is apparently influential in the sweetening. In activating a new bed of catalyst, an excess of elemental sulphur may be added to the sour distillate wetting the catalyst but the catalyst should preferably at this time be substantially alkali free in the sense of containing no added alkali. In the later use of the bed, the petroleum fraction to be sweetened will contain an amount of sulphur sufficient to convert the mercaptans to disulphides and may contain added alkali in accordance with well known sweetening practices.

As an example of the rejuvenating, reconstituting or reconditioning of a catalyst mass containing adequate lead but cemented or adhered by gums through failure to use a suitable gum inhibitor in the previously sweetened oil, the mass in the towers was broken into large chunks by boring, picking and jarring. These were spaced on an outside concrete floor in a layer about 3″ deep, the mass being periodically stirred by raking. With three days of sunshine and good air circulation the catalyst had crumbled to substantially its original size of about 5/16″ due to oxidation of the gums. The particles were then screened to remove larger-sized rocks that had been used as the support bed in the towers.

The catalyst was examined and found to have an adequate lead content as PbO and PbS. It was returned to the catalyst cases and blown with hot air at 350° F. until the outlet temperature was about 265° F. and was free of obnoxious odor of the decomposition products. Kerosene was charged to the units as the catalyst cooled. The towers were then saturated by bubbling $H_2S$ therethrough until a strong odor of the gas appeared in the effluent. The towers were then closed and permitted to stand for 3 days. When then used on a straight run gasoline having 0.03% mercaptans, the effluent contained only 0.0001% thereof at a rate of 2800 bbls./day. A mixture of pressure distillate and straight run gasoline containing a suitable gum inhibitor (UOP #5) was sweetened at a rate of 3800 bbls./day producing a product that was doctor sweet and noncorrosive. The reconditioned catalyst was considered superior to the original in efficiency.

Various changes can be made without departing from the spirit of the invention as defined in the appended claims.

I claim as my invention:

1. A process for the reconditioning of a lead sulphide catalyst present as a coating on granular particles of a base material, which particles have become solidified by gums from petroleum distillates passed therethrough in the sweetening of such petroleum distillates, which process includes the steps of: subdividing such solidified catalyst to granular size; and decomposing said gums by air-blowing the subdivided catalyst with hot air at a temperature of about 250–350° F. until the catalyst is dry.

2. A process as defined in claim 1 in which the subdividing step includes subdividing the solidified mass into chunks and then spreading such chunks on a surface in contact with air to effect decomposition of said gums and further subdivision of said catalyst to said granular size before said airblowing thereof.

3. A process for the reconditioning of a lead sulphide catalyst that has become solidified by gums from petroleum distillates passed therethrough in a sweetening operation, said process including the steps of: subdividing said catalyst into chunks; further subdividing said chunks by spreading them on a surface exposed to the atmosphere to effect decomposition of the gums and produce particles of catalyst of a size about ¼–⅜, said particles being coated with PbO and PbS; airblowing a mass of said particles to dry same by passing through said mass air at a temperature of about 250–350° F. while continuing such air passage until the temperature of the effluent air from said mass is about 250–300° F.; flooding the mass before exposure to moisture with a petroleum distillate boiling in the kerosene range; and bubbling $H_2S$ through the mass to saturate same and convert PbO on the surfaces of said particles to PbS.

4. A process as defined in claim 3 including the further step of conditioning the $H_2S$-saturated mass before use in sweetening operations by allowing said mass to stand for a period of at least a day to improve and harden the PbS coatings before such use 5. A process for converting PbO on the surface of granular particles of a base material to PbS, which process includes the steps of: airblowing a mass of said particles at a temperature of about 250–350° F. until said particles are dry; flooding the mass with a petroleum distillate; and bubbling $H_2S$ through the mass to saturate same and convert the PbO on the surface of said granular particles to PbS.

6. A process as defined in claim 5 including the additional step of conditioning the $H_2S$-saturated mass before use in sweetening operations by allowing same to stand for a period of at least a day to improve and harden the PbS coatings before such use.

7. A process for converting PbO on the surface of granular particles of a base material to PbS, which process includes the steps of: airblowing a mass of said particles at a temperature of about 250–350° F. until said particles are dry; flooding the mass with a sour distillate containing mercaptans but containing an excess of elemental sulphur over and above the amount required to react with the mercaptans, the resulting distillate being substantially free of added alkali; and bubbling $H_2S$ through the mass to saturate same and convert the PbO on the surface of said granular particles to PbS.

8. A process for the reconditioning of a lead sulphide catalytic bed comprising particles of a base material, selected from the class consisting of furnace slag, Carborundum and sawdust, coated with a lead oxide material adhered by a binder, which catalytic bed has become solidified in the sweetening of petroleum distillates passing therethrough in the sweetening operation, which process includes the steps of: subdividing such solidified mass into chunks; further subdividing such chunks on a surface in contact with air to substantially the size of said particles of base material; and drying a mass of the subdivided particles by passing therethrough a stream of hot air at a temperature of about 250–350° F. until the particles are dry.

References Cited in the file of this patent

UNITED STATES PATENTS

| | | |
|---|---|---|
| 1,777,619 | Low | Oct. 7, 1930 |
| 1,810,369 | Peterkin | June 16, 1931 |
| 2,272,596 | Bender | Feb. 10, 1942 |
| 2,398,175 | Cole | Apr. 9, 1946 |

UNITED STATES PATENT OFFICE
CERTIFICATE OF CORRECTION

Patent No. 3,117,937          January 14, 1964

James G. Suthard

It is hereby certified that error appears in the above numbered patent requiring correction and that the said Letters Patent should read as corrected below.

Column 3, line 13, for "work" read -- week --; line 27, for "then" read -- than --; column 4, line 34, for "1/4-3/8" read -- 1/4-3/8" --.

Signed and sealed this 14th day of July 1964.

(SEAL)

Attest:

ESTON G. JOHNSON
Attesting Officer

EDWARD J. BRENNER
Commissioner of Patents